United States Patent
Torres Ramon et al.

(10) Patent No.: US 8,670,346 B2
(45) Date of Patent: Mar. 11, 2014

(54) PACKET CLASSIFICATION METHOD AND APPARATUS

(75) Inventors: Javier Maria Torres Ramon, Madrid (ES); Dimitrios Christodoulou, Madrid (ES); Luis Maria Lafuente Alvarez, Madrid (ES); David Manzano Macho, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 102 days.

(21) Appl. No.: 13/263,203

(22) PCT Filed: Nov. 27, 2009

(86) PCT No.: PCT/EP2009/065967
§ 371 (c)(1),
(2), (4) Date: Oct. 6, 2011

(87) PCT Pub. No.: WO2011/063846
PCT Pub. Date: Jun. 3, 2011

(65) Prior Publication Data
US 2012/0033581 A1  Feb. 9, 2012

(51) Int. Cl.
*G01R 31/08* (2006.01)

(52) U.S. Cl.
USPC .................. 370/253; 370/237; 709/206

(58) Field of Classification Search
USPC ........... 370/200–253, 392; 709/246, 223, 228
See application file for complete search history.

(56) References Cited

U.S. PATENT DOCUMENTS

| | | | |
|---|---|---|---|
| 2009/0262741 A1* | 10/2009 | Jungck et al. | 370/392 |
| 2010/0121960 A1* | 5/2010 | Baniel et al. | 709/228 |
| 2011/0058479 A1* | 3/2011 | Chowdhury | 370/237 |

* cited by examiner

Primary Examiner — Ricky Ngo
Assistant Examiner — Iqbal Zaidi

(57) ABSTRACT

Apparatus for performing packet classification of data packets belonging to a packet flow through a packet data network. The apparatus comprises an ingress interface for receiving packets of said packet flow, and an active filter for disturbing one or more of said packets or for otherwise disturbing a characteristic of said flow. An egress interface is provided for sending the packets including a disturbance towards a destination. A monitor is also provided for monitoring said packet flow and/or one or more associated packet flows received by the apparatus to detect subsequent reactions in the flow/s to the disturbance, while a flow classifier is provided for attempting to classify the flow into one of a set of defined classes according to a detected reaction.

14 Claims, 3 Drawing Sheets

PACKET CLASSIFICATION METHOD AND APPARATUS

TECHNICAL FIELD

The present invention relates to a classification method and apparatus for classifying data packets of a packet flow, such as might be used for example to classify Internet Protocol (IP) packet flows (IP flows) within a packet data network. The invention is applicable in particular, though not necessarily, to Policy and Charging Control in a telecommunications system.

BACKGROUND

Modern telecommunication systems may incorporate Policy and Charging Control (PCC) architectures. A PCC architecture is described in 3GPP TS 23.203 in respect of packet flows (e.g. IP flows) in a data session (e.g., in 3GPP TS 23.203 terminology: an "IP Connectivity Access Network session", IP-CAN session) established by a user equipment UE through a 3G telecommunications system. The particular architecture comprises: a Policy and Charging Rules Function (PCRF) and a Policy and Charging Enforcement Function (PCEF). The PCRF behaves as a Policy Decision Point (PDP) or Policy Server (PS), and the PCEF behaves as a Policy Enforcing Point (PEP). Whilst the PCRF can be implemented as a standalone node, it is preferably co-located within an Access Gateway (AG) such as a GPRS Gateway Support Node (GGSN) in a General Packet Radio Service (GPRS) core network. Related architectures are provided for 3GPP2 networks and TISPAN Next Generation Networks.

A packet data flow (such as an IP flow) is a set of data packets (e.g. IP packets) passing a routing node in a packet data network during a certain time interval to or from the same endpoints. For example, a packet flow may be an IP flow, where each packet of the flow contains the same values of source IP address, source application layer port (e.g. TCP), destination IP address and destination application layer port. A routing node may an apparatus in a network arranged to forward a received data packet. Examples of routing nodes are an "Access Gateway" or the "classifier/DPI Node" illustrated in FIG. 1. Some routing nodes in a network can perform further functions (such as Quality of Service and charging functions). An example is a Policy and Charging Enforcing Function (PCEF) as defined in 3GPP specification TS 23.203.

When a User Equipment (UE) initiates a data session (e.g. an IP-CAN session), a packet data network address, such as an IP address, is assigned to it by an appropriate AG. The AG provides this IP address, together with, for example, an NAI, IMSI, or MSISDN, to the PS which in turn downloads into the AG a set of policy rules to be applied to the data session. Commonly, the assigned IP address is used to identify data sessions between parties (e.g. between user terminals UEs, and or between a UE and a server, such as an Application Function AF). When the UE communicates with a (final) Application Function (AF), the AF provides session details to the PS. When the UE subsequently requests resources for the service provided by the AF, the PS downloads into the AG a further set of policy rules based on the session details provided by the AF. In a 3GPP network, the AF may be a Proxy Call Session Control Function, P-CSCF, or another kind of application server to which the UE establishes an application communication via bearer(s) set up via IP-CAN session(s) through the AG.

Typically, a policy rule comprises a so-called IP 5-Tuple vector describing a data packet flow within a data session (namely; orig IP-addr/port, dest IP-addr/port, protocol-TCP/UDP). The PCEF inspects packets to detect the relevant tuples and apply the rules. However, this technique allows only a limited (coarse) analysis of packets, as it does not allow packet inspection beyond these five IP headers, e.g. it does not allow inspection of payload data.

So-called "Deep Packet Inspection" (DPI) is a mechanism that can be deployed at an intermediate node within an IP network in order to inspect fields within packets of an IP flow at a level beneath the layer 3 IP addresses and port numbers. DPI may be advantageously deployed within a PCC architecture of a 3GPP network or other telecommunications network in order to classify packet flows at a level deeper than that allowed by inspection of only the 5-Tuple layer 3 vector. FIG. 1 illustrates schematically an exemplary PCC architecture in which a further DPI node is deployed (e.g. a node performing packet inspection for classifying packets), for the exemplary case where an IP flow travels in one direction from a user equipment UE1 to user equipment UE2. FIG. 1 illustrates schematically an exemplary PCC architecture wherein a further packet classifier/DPI node is deployed, which performs deep packet inspection for classifying packets. Other approaches, e.g. shallow packet inspection, may alternatively be employed In DPI terminology, a "class" is defined by certain IP flow characteristics. IP flows fall into one or more classes. A "classifier" is an algorithm that predicts a class or classes to which an IP flow belongs. A "class model" of a classifier is the set of IP flows that a classifier will predict as belonging to that class.

A DPI mechanism may allow labels to be applied to packets of a packet flow in order to identify, for example, a class to which the packet flow belongs. Labels can then be used at routing nodes to, for example, check suspicious traffic, limit the bandwidth of certain applications, cut-off a flow, apply certain Quality of Service and/or charging policies, mine data, etc.

DPI solutions may utilise header matching for IP, or protocols over IP such transport layer protocols (TCP, UDP) or application layer protocols (HTTP protocol, SIP protocol, some peer-to-peer protocols, etc). Some may further or alternatively use patterns on statistical properties of the data flow, such as mean or variance of upstream/downstream packets, or jitter in packet sending. Other DPI solutions calculate simple correlation measurements between these quantities. A few have even started to use data mining techniques to classify or cluster IP flows, sometimes using semi-supervised techniques to classify many similar unlabelled examples with just a few pre-labelled examples. Statistical properties, being numerical quantities, are amenable to data mining treatment.

Given the huge and increasing number of services available today over IP networks, and the diverse characteristics that these services can have with regard to DPI characteristics, it is likely that certain IP flows will not easily classified by existing DPI solutions which are generally passive in nature.

Patent publication EP 1764951A1 describes a DPI solution for real-time packet classification, wherein the packet flow classifiers are updated "off-line" dynamically. The solution is based on passive rules governing the packet classifiers, in the sense that only the content of the sampled packets is used for classification.

SUMMARY

According to a first aspect of the present invention there is provided apparatus for performing packet classification of data packets belonging to a packet flow through a packet data network. The apparatus comprises an ingress interface for receiving packets of said packet flow, and an active filter for disturbing one or more of said packets or for otherwise disturbing a characteristic of said flow. An egress interface is provided for sending the packets including a disturbance towards a destination. A monitor is also provided for monitoring said packet flow and/or one or more associated packet flows received by the apparatus to detect subsequent reactions in the flow/s to the disturbance, whilst a flow classifier is provided for attempting to classify the flow into one of a set of defined classes according to a detected reaction.

Embodiments of the invention may improve the reliability with which packet flows can be classified. This may be beneficial from the point of view of controlling service access, charging, and quality of service.

The active filter may be configured to disturb one or more of said packets or said characteristic of the flow by performing one or more of the following actions:

delaying the sending of one or more packets at said egress interface;
 introducing jitter into the packet flow at said egress interface;
 dropping one or more packets;
 replacing one or more packets with alternative packets;
 altering IP headers in the packets;
 actively introducing noise;
 forging a false response packet;
 deleting or overwriting packets;
 modifying or deleting specific fields in the header part of the packet
 routing packets to another sender/receiver different from the originator;
 changing the order of the packets within the flow; and
 resending previously sent packets.

The active filter may be configured to increase the severity of the disturbance over time at least until a reaction is detected.

The flow classifier may be configured to attempt to classify a received packet flow using one or more passive classifiers each relying upon characteristics of the received flow without the interruption of a disturbance into the flow, wherein said active filter is applied only if the flow cannot be classified by the passive classifier/s. The flow classifier may be further configured to adapt one or more of said passive classifiers in dependence upon a successful classification of said packet flow.

The apparatus may comprise a packet labeller for adding to one or more packets of said packet flow a label identifying a class determined for the flow. This may facilitate handling of the flow by upstream network entities.

According to a second aspect of the present invention there is provided a method of performing a packet classification of data packets belonging to a packet flow through a packet data network. The method comprises receiving packets of said packet flow, disturbing one or more of said packets or otherwise disturbing said flow, and sending the packets including a disturbance towards a destination. The packet flow and/or one or more associated received packet flows is then monitored to detect subsequent reactions in the flow/s to the disturbance, and an attempt made to classify the flow into one of a set of defined classes according to a detected reaction.

The severity of the disturbance may be increased over time at least until a reaction is detected. An attempt may be made to classify a received packet flow using one or more passive classifiers each relying upon characteristics of the received flow without the interruption of a disturbance into the flow, wherein the step of disturbing is applied only if the flow cannot be classified by the passive classifier/s. This may comprise adapting one or more of said passive classifiers in dependence upon a successful classification of said packet flow.

The method may comprise adding to one or more packets of said packet flow a label identifying a class determined for the flow.

According to a third aspect of the present invention there is provided a computer program for causing a computer to perform the method of the above second aspect of the present invention.

DETAILED DESCRIPTION

Figure 1:
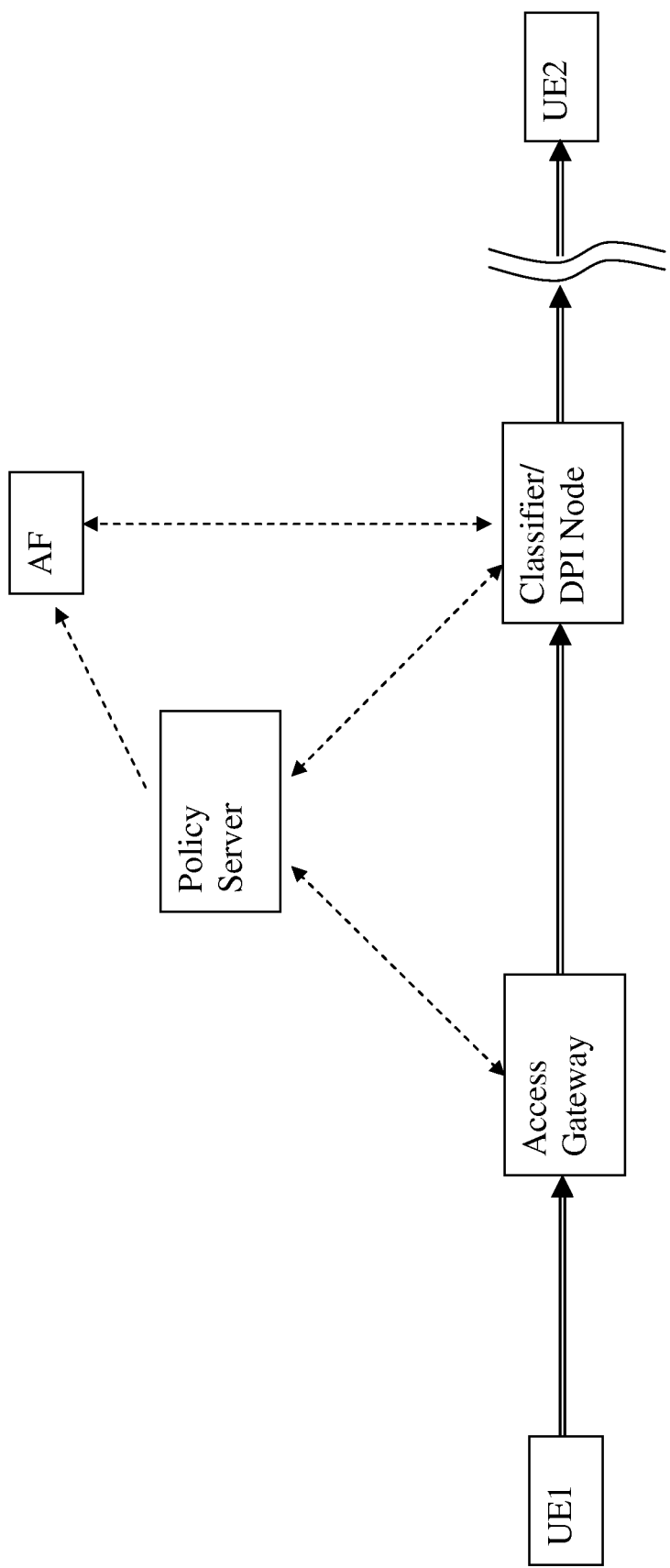
FIG. 1 illustrates schematically a known Policy and Charging Control architecture implemented within a packet data network.

The application of packet inspections mechanisms (e.g. a Deep Packet Inspection, DPI, mechanism, or a shallow packet inspection mechanism based on inspection of IP 5 Tuple contents or even monitoring flow properties) for packet classification purposes within a packet data network such as a telecommunications network is desirable for a number of reasons. For example, it may be necessary to determine the application or service to which a given packet flow relates in order to ensure that an appropriate quality of service is applied and/or to ensure that an appropriate charging tariff is applied. In some cases, a network operator may want to block flows associated with certain applications and services.

An approach is described here which relies upon generally conventional, passive classifiers to perform a first-pass classification of IP flows. In the event that a flow cannot be classified using these passive classifiers however, the flow is "disturbed" in some way, i.e. changes are made to one or more characteristics of the flow. The disturbance may comprise acting over a characteristic parameter of a data flow such as, for example, the number of packets sent per second, the standard deviation of the number of bytes sent per second, etc. Additionally or alternatively, the disturbance may comprise disturbing one or more of the packets in the flow. The disturbance is such that it may "force" or otherwise cause one or more of the participants to react in a particular way. The reaction(s) of any of the involved parties in the flow is (are) analyzed, e.g., by measuring a variance on a characteristic of the flow(s). Reactions can include a variation in the disturbed flow or in associated flow(s), e.g. other flows related to the same data session, the creation/deletion of associated flows, and deletion of the disturbed flow. The result of the analysis is then used to classify the flow according to existing, or new, classification rules.

An implementation of this approach preferably monitors IP flows going through a segment of a network, which could be a network carrying traffic entering the network over a fixed line access network or over a mobile access network. For example, apparatus can be employed which registers information about flows and packets using packet inspection techniques. The mechanism may be based on a dynamic learning approach, such as the one described in EP1764951A1. For example, specific packets and the flow itself (e.g. statistics characteristics like mean, minimum, maximum or median packet size, mean packet inter arrival time, etc) may be kept in real time and used as input features to classifiers to label the flows. The classifiers can also use other features including regular expressions, protocol fields, etc. The classifiers can be obtained offline, or optionally adapted online with new incoming data, in case reliable labels are available for new samples. Classifiers can be implemented using different methods, such as: "naïve Bayes classifier" based algorithms, or rule extraction algorithms like "C4.5". The mechanism additionally places certain flows into a special "unknown" category, where those flows cannot be classified (typically with some confidence threshold applied) using the passive classifiers.

Upon identification of a flow that cannot be reliably classified by the passive classifiers (the "unknown" category), the system can take one of a set of actions so as to disturb one or more of the packets in a flow, or for otherwise disturbing a characteristic of said flow. Examples of actions are;

delaying packets for either a fixed or variable amount of time,
    throwing packets away,
    altering the IP headers in the packets,
    actively introducing noise,
    forging a false response,
    deleting or overwriting packets to see the reactions of the end points,
    modifying or deleting specific fields in the header part of the packet,
    routing the packets to another sender/receiver different from the original,
    changing the order of the packets,
    resending previously sent packets.

The system associates a further classifier with each of the actions, a classifier taking the observed "result" or "reaction" in the flow(s) as an additional input for classification. Preferably, only one action is performed at a time. Such a classifier may also receive as an input a passive characteristic of the flow, e.g. the mean packet size.

The action chosen depends on the reliability of the classifier associated with each action, e.g. the system could select the classifier with the highest global accuracy, defined as the percentage of a sample test dataset correctly classified, or choose the classifier with the lowest probability of not being able to identify the flow, taking into account the new result. For example, throwing away 10% of the packets may be associated with a classifier having an accuracy of 75% (i.e. 25% of the test dataset cases have been mislabelled). Another disturbing action, such as delaying every packet in the flow by 100 ms, may be associated with another classifier with a 95% accuracy. The system preferably chooses the second action over the first since the probability of reaching a correct classification decision would be higher.

Once an action has been selected, the system will apply the action to the flow in question and will monitor and record the resulting subsequent behaviour. The results will generally allow the flow to be classified with an increased confidence level. The results may also be collected and used to update the flow classifiers. For example, if a disturbance allows an a priori unclassified flow to be classified with a high level of confidence, a characteristic of the flow may be used to update one or more of the passive classifiers. In the event that a flow remains unclassified even after introducing a disturbance, information concerning the flow may be retained, for example, to prevent the needless application of a disturbance to a future unclassified flow exhibiting similar characteristics.

Figure 2:
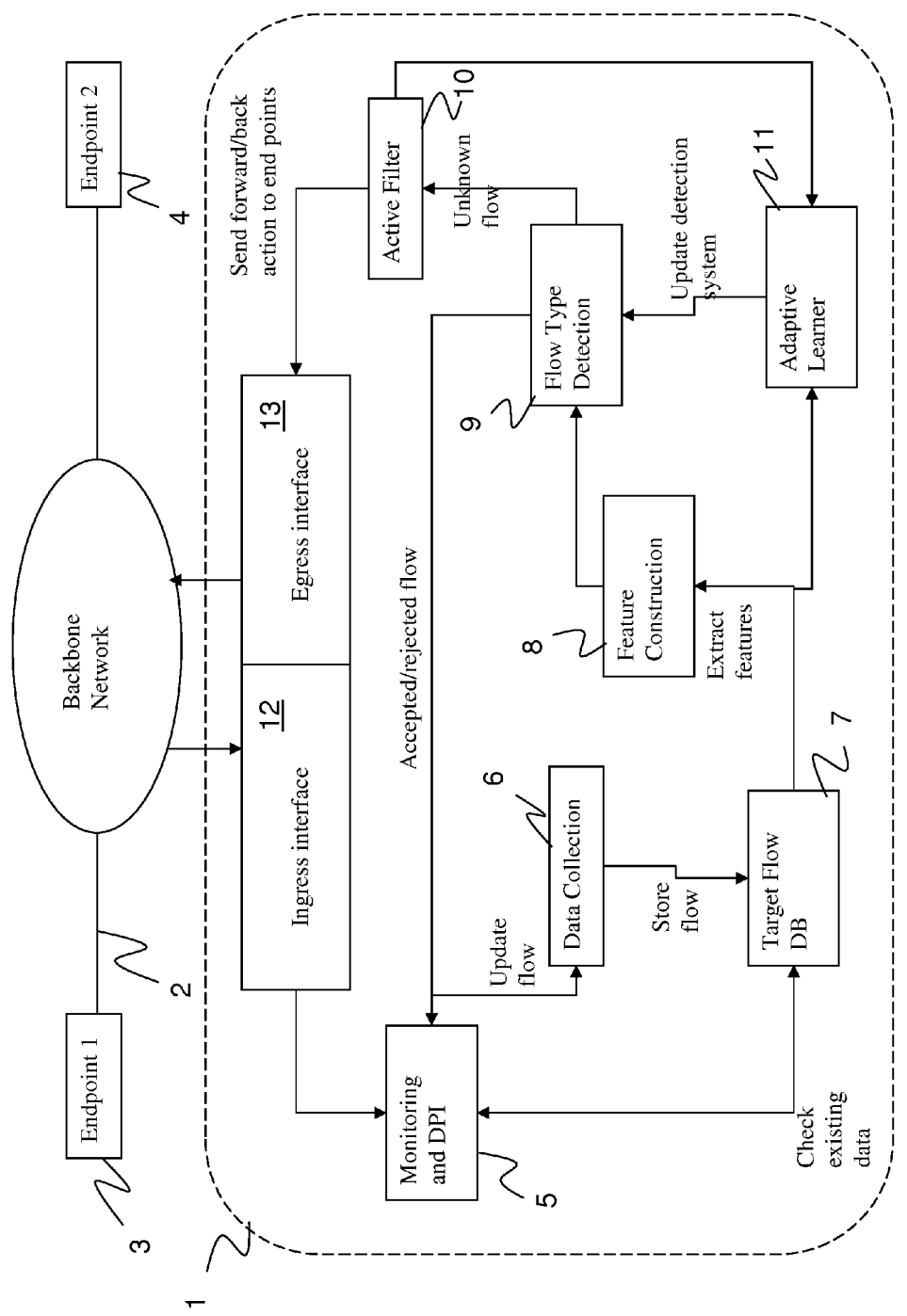
FIG. 2 illustrates schematically a network apparatus located within an IP backbone network and configured to perform packet classification procedures according to an embodiment of the invention.

FIG. 2 illustrates schematically a network apparatus 1 configured to perform classification of data packets based upon the approach introduced above, and being coupled to a backbone network via ingress and egress interfaces 12,13. A classification approach based upon DPI is presented by way of example, although alternative approaches may be employed. Other network nodes which might—in some cases—intervene in the control of the data session between the illustrated endpoints, and/or routing packet flow(s) associated to said session, (e.g. as shown in FIG. 1), are not illustrated for simplicity. This apparatus may be, for example, a computer or array of computers with appropriate hardware and software, and is provisioned within an IP (backbone) network. The software may comprise one or more computer programs having computer readable program code that, when executed by a (computer-based) apparatus 1 makes it to behave according to a predefined manner, as determined by the specific program instructions in said programs, which can be arranged according to any of the described or alternative embodiments of the invention. The apparatus 1 may be provided as a standalone node within the network, or may be collocated with some other node. For example, in the case of a PCC architecture within a 3GPP network, the apparatus may be collocated with a Gateway GPRS Serving Node (GGSN). In the case of a Long Term Evolution/Enhanced Core Network (LTE/ECN) based network, the apparatus may be collocated with a Packet Data Network Gateway node (PDN-GW). FIG. 2 illustrates an exemplary IP flow 2 between a pair of endpoints 3, 4, which might be for example user terminals, network servers, or one of each. The apparatus 1 is provided with the following modules:

Monitoring and DPI, 5

This module is responsible for flow tracking and packet inspection functionalities. When a packet arrives at the Monitoring and DPI module, it is determined if the packet is part of an already tracked flow (using a tracked flow database, e.g. the 5-tuple information is used as the look-up key). If the packet belongs to such an existing flow, the information is passed through a Data Collection module 6 which will update the corresponding flow record, e.g. to update the cumulative data volume. If the flow is not already being tracked, the flow is identified to the Data Collection module 6 which will create a new record for the flow.

Data collection, 6

This module is responsible for managing and aggregating information concerning all flows (e.g. source IP, target IP, source Port, protocol, size, number of packets, average size of these packets, etc), storing the information into the target flow database 7.

Target Flow Database, 7

The target flow database stores aggregated information for each tracked packet flow.

Feature construction, 8

The Feature Construction module 8 is responsible for the selection of a set of relevant features (from those available) and the construction of a learning model using the selected features that will be used by the Flow type detection system 9. This process of removing irrelevant and/or redundant features from the data and generating new features helps to improve the performance of the corresponding learning models (i.e. reduce dimensionality). The process is performed by the application of, for example, regression or filtering techniques.

Flow type detection, 9

After the relevant flow features have been obtained, detection of the flow type can be performed. This process aims to classify (as much as possible) each of the tracked flows into a class of an existing taxonomy. The flows can be handled by a rule-based classification procedure (e.g. using a C4.5 based algorithm, K-Nearest Neighbour, or other rule based classifier), or other mechanism not necessarily based on rules, such as SVM ("Support Vector Machine") based algorithms or ANN ("Artificial Neural Network") based algorithms. As discussed above, the classifier may decide that it does not have enough "evidence" to assign the flow to an existing class, applying instead an "unclassified" label to the flow. A classifier can use a previous clustering analysis to improve the classification process.

Active filter, 10

The active filter acts on an "unclassified" flow, for example by modifying, deleting, or retaining packets. This action is termed a "perturbation". A perturbation on a flow in a routing node (e.g. the apparatus depicted in FIG. 2) is an action taken by the node over a flow, normally different from the defined behaviour of the routing node. This action can be taken on different layers of the protocol used, e.g. on one of IP, TCP or HTTP (depending of course upon the protocols in use). Examples of actions are delaying packets (by either a fixed or a variable amount), discarding packets (e.g. periodically or randomly), altering packet IP headers, actively introducing noise, forging a false response, deleting or overwriting packets to see the reactions of the end points, modifying or deleting specific fields in the header part of a packet, routing the packets to another sender/receiver different from the originator, changing the order of the packets, resending previously sent packets, etc. Actions may be of a fixed extent, or may be varied, e.g. increasing in severity until a reaction occurs. It may comprise actively introducing noise or "forging" a false response. Reactions in the flow(s) of one or both of the endpoints are monitored by the previously mentioned Monitoring and DPI module 5 and the results stored into the Target flows database 7.

Adaptive learner, 11

A new classifier is applied to the packet flow using the old (unmodified) and the new (modified) information. This leads to a behaviour classification scheme which classifies unknown flows into behaviour classes based on their similarity/dissimilarity compared to some predefined classes. The behaviour analysis provides additional attributes that can be used to update the flow type detection classifiers. With this new information, the Adaptive Learner module 11 can reconstruct the classification rules used by the Flow type detection 9. For example, if C4.5 algorithms are used, it can replace the class distribution of the leaf nodes, or expand the leaf nodes to include new clauses. An additional attribute for a class might for example state that, after taking an action X, a response Y is observed.

The following example illustrates the approach described above. Consider the problem of distinguishing between a VoIP payload and a normal HTML payload over HTTP. Consider two flows, each having a certain mean HTTP payload size. If the bandwidth allocated to the HTML payload is reduced, the mean packet size will remain the same. In the case of a normal HTML payload, a web page will be displayed more slowly (i.e. the rate of packet reception will decrease), but the browser will not take any special action. However, in the case of VoIP traffic, an end user VoIP application may want to renegotiate the codec used in order to reduce the mean packet size whilst keeping the rate of packets constant. This reaction in the packet flow can be detected and used to classify the flow.

A purely passive DPI approach according to the prior art will find it difficult to adapt to the introduction of new applications, services, and user devices. Moreover, such an approach may be "fooled" by a malicious end user or terminal into classifying a packet flow of a certain class into an incorrect class. For example, once the behaviour of the passive filter is known, applications can adapt so that they present an identical profile to that of other applications. If the filter can create small traffic incidents at some arbitrary points, disguised applications may need to behave as if the incident were caused by real traffic circumstances. This will present distinct "fingerprints" when compared with other applications.

Figure 3:
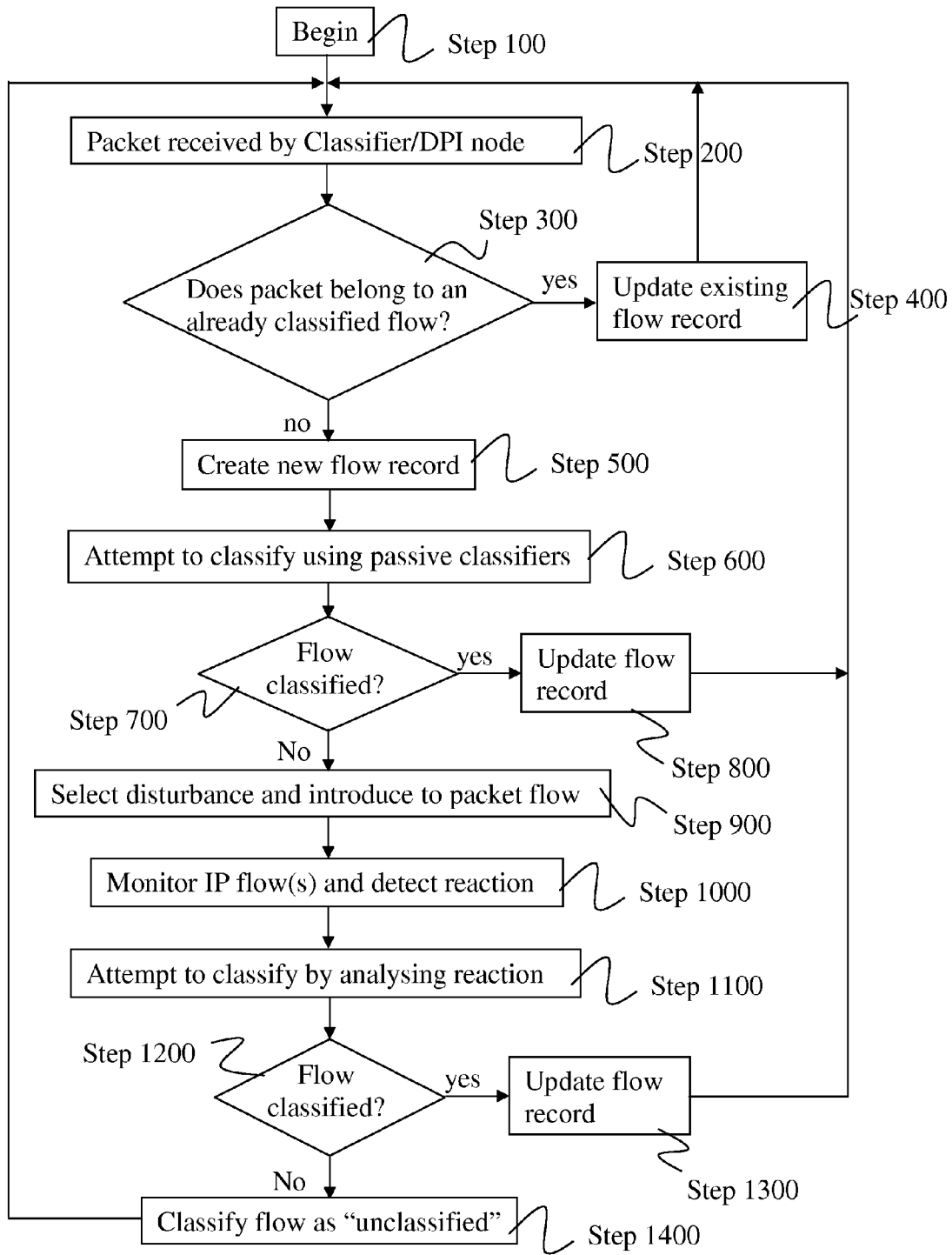
FIG. 3 is a flow diagram illustrating a packet classification procedure for classifying packet flows employing the apparatus of FIG. 2.

FIG. 3 is a flow diagram illustrating a procedure in accordance with the approach detailed above. The process begins at step 100, and at step 200 a packet is received at a classifier/DPI node within a packet data network. At step 300, header fields of the packet are inspected to determine whether or not the flow is an existing, already classified flow. If so, no further action is taken other than to update any appropriate traffic reports for the flow, at step 400. If however the packet belongs to a flow that is currently unclassified, e.g. a new flow, then at step 500 a new flow record is specified. At steps 600 and 700, an attempt is made to classify the flow using the defined passive classifiers. Of course, this may involve receiving a sequence of packets within the same flow, and not just a single packet. If the flow can be classified at this stage, then at step 800 the newly created flow record is updated to record the flow class (and to add any other flow information).

If on the other hand the flow cannot be classified, then at step 900 an appropriate disturbing action is selected and introduced to the packet or flow. At step 1000, the disturbed flow, or an associated flow (e.g. the return flow in the opposite direction, or any other flow related to the same data session between the involved parties such as UE1 and UE2 illustrated in FIG. 1) is monitored to detect a reaction. If a reaction is detected, then at step 1100 an attempt may be made to classify the flow based upon that reaction. If at step 1200 the flow can be classified, then the flow record is updated at step 1300 with the determined class. Otherwise, at step 1400 the flow is recorded as unclassified. Although not shown, this may be recorded in the flow record.

It will be appreciated by the person of skill in the art that various modifications may be made to the above described embodiments without departing from the scope of the present invention.

The invention claimed is:

1. An apparatus for performing packet classification of data packets belonging to a packet flow through a packet data network, the apparatus comprising:
   an ingress interface configured to receive packets of said packet flow;
   an active filter configured to change one of at least one packet and at least one characteristic of the packet flow;
   an egress interface configured to send, towards a destination, the packets including the change of one of the at least one packet and at least one characteristic of the packet flow;
   a monitor configured to monitor one of said packet flow and at least one associated packet flow received by the apparatus to detect reactions in the packet flow caused by the change of one of the at least one packet and at least one characteristic of the packet flow; and
   a flow classifier configured to:
      attempt to classify a received packet flow using at least one of a plurality of passive classifiers each relying upon characteristics of the received flow without the interruption of the changed one of the at least one packet and at least one characteristic of the packet flow into the flow wherein said active filter is applied only if the flow cannot be classified by the one or more passive classifiers; and if the flow cannot be classified by the one or more passive classifiers, attempt to classify the flow into one of a set of defined classes according to a detected reaction.

2. The apparatus according to claim 1, said active filter being configured to change one of at least one packet and at least one characteristic of the packet flow includes performing at least one of:
- delaying the sending of one or more packets at said egress interface;
- introducing jitter into the packet flow at said egress interface;
- dropping one or more packets;
- replacing one or more packets with alternative packets;
- altering IP headers in the packets;
- actively introducing noise;
- forging a false response packet;
- deleting or overwriting packets;
- modifying or deleting specific fields in the header part of the packet
- routing packets to another sender/receiver different from the originator;
- changing the order of the packets within the flow; and
- resending previously sent packets.

3. The apparatus according to claim 2, said active filter being configured to increase the severity of the change of one of the at least one packet and at least one characteristic of the packet flow over time at least until a reaction in the packet flow caused by the change of one of the at least one packet and at least one characteristic of the packet flow is detected.

4. The apparatus according to claim 1, further comprising a packet labeler configured to add to at least one packet of said packet flow a label identifying a class determined for the flow.

5. An apparatus for performing packet classification of data packets belonging to a packet flow through a packet data network, the apparatus comprising:
- an ingress interface configured to receive packets of said packet flow;
- an active filter configured to change one of at least one packet and at least one characteristic of the packet flow;
- an egress interface configured to send, towards a destination, the packets including the change of one of the at least one packet and at least one characteristic of the packet flow;
- a monitor configured to monitor one of said packet flow and at least one associated packet flow received by the apparatus to detect reactions in the packet flow caused by the change of one of the at least one packet and at least one characteristic of the packet flow; and
- a flow classifier configured to:
  - attempt to classify a received packet flow using at least one of a plurality of passive classifiers each relying upon characteristics of the received flow without the interruption of the changed one of the at least one packet and at least one characteristic of the packet flow into the flow, wherein said active filter is applied only if the flow cannot be classified by the one or more passive classifiers;
  - if the flow cannot be classified by the one or more passive classifiers, attempt to classify the flow into one of a set of defined classes according to a detected reaction caused by the chance of one of the at least one packet flow and the at least one characteristic of the packet flow; and
  - adapt at least one passive classifier in dependence upon a successful classification of said packet flow.

6. The apparatus according to claim 5, said active filter being configured to change one of at least one packet and at least one characteristic of the packet flow includes performing at least one of:
- delaying the sending of one or more packets at said egress interface;
- introducing jitter into the packet flow at said egress interface;
- dropping one or more packets;
- replacing one or more packets with alternative packets;
- altering IP headers in the packets;
- actively introducing noise;
- forging a false response packet;
- deleting or overwriting packets;
- modifying or deleting specific fields in the header part of the packet
- routing packets to another sender/receiver different from the originator;
- changing the order of the packets within the flow; and
- resending previously sent packets.

7. The apparatus according to claim 5, said active filter being configured to increase the severity of the change of one of the at least one packet and at least one characteristic of the packet flow over time at least until a reaction in the packet flow caused by the change of one of the at least one packet and at least one characteristic of the packet flow is detected.

8. The apparatus according to claim 5, further comprising a packet labeler configured to add to at least one packet of said packet flow a label identifying a class determined for the flow.

9. A method of performing a packet classification of data packets belonging to a packet flow through a packet data network, the method comprising:
- receiving packets of said packet flow;
- attempting to classify the packet flow using at least one of a plurality of passive classifiers each relying upon characteristics of the packet flow without interruption of a changed one of at least one packet and at least one characteristic of the packet flow into the flow,
- only if the packet flow cannot be classified by the at least one passive classifier:
  - changing one of at least one packet and at least one characteristic of the packet flow with an active filter;
  - sending the packets, towards a destination, including the change of one of the at least one packet and at least one characteristic of the packet flow;
  - monitoring at least one of said packet flow and at least one associated received packet flow to detect reactions in the packet flow caused by the change of one of the at least one packet and at least one characteristic of the packet flow; and
  - attempting to classify the flow into one of a set of defined classes according to a detected reaction.

10. The method according to claim 9 further comprising increasing the severity of the change of one of the at least one packet and at least one characteristic of the packet flow over time at least until a reaction in the packet flow caused by the change of one of the at least one packet and at least one characteristic of the packet flow is detected.

11. The method according to claim 9, comprising adding to at least one packet of said packet flow a label identifying a class determined for the flow.

12. A method of performing a packet classification of data packets belonging to a packet flow through a packet data network, the method comprising:
- receiving packets of said packet flow;
- changing one of at least one packet and at least one characteristics of the packet flow;

sending the packets, towards a destination, including the change of one of the at least one packet and at least one characteristic of the packet flow;

monitoring at least one of said packet flow and at least one associated received packet flow to detect reactions in the packet flow caused by the change of one of the at least one packet and at least one characteristic of the packet flow;

attempting to classify the flow into one of a set of defined classes according to a detected reaction;

attempting to classify a received packet flow using at least one passive classifier each relying upon characteristics of the received flow without the interruption of the changed one of the at least one packet and at least one characteristic of the packet flow into the flow, wherein the step of disturbing is applied only if the flow cannot be classified by the at least one passive classifier; and adapting the at least one passive classifier in dependence upon a successful classification of said packet flow.

13. The method according to claim 12, further comprising increasing the severity of the change of one of the at least one packet and at least one characteristic of the packet flow over time at least until a reaction in the packet flow caused by the change of one of the at least one packet and at least one characteristic of the packet flow is detected.

14. The method according to claim 12, further comprising adding to at least one packet of said packet flow a label identifying a class determined for the flow.

* * * * *

UNITED STATES PATENT AND TRADEMARK OFFICE
CERTIFICATE OF CORRECTION

PATENT NO. : 8,670,346 B2  
APPLICATION NO. : 13/263203  
DATED : March 11, 2014  
INVENTOR(S) : Torres Ramon et al.

Page 1 of 1

It is certified that error appears in the above-identified patent and that said Letters Patent is hereby corrected as shown below:

In the Claims:

In Column 9, Line 21, in Claim 2, delete "packet" and insert -- packet; --, therefor.

In Column 9, Line 63, in Claim 5, delete "chance" and insert -- change --, therefor.

In Column 10, Line 16, in Claim 6, delete "packet" and insert -- packet; --, therefor.

Signed and Sealed this
Twenty-second Day of July, 2014

Michelle K. Lee
*Deputy Director of the United States Patent and Trademark Office*